June 2, 1959   J. A. KRAMER   2,889,051
FOLDING SERVING TRAY FOR AUTOMOBILES AND THE LIKE
Filed Jan. 23, 1956
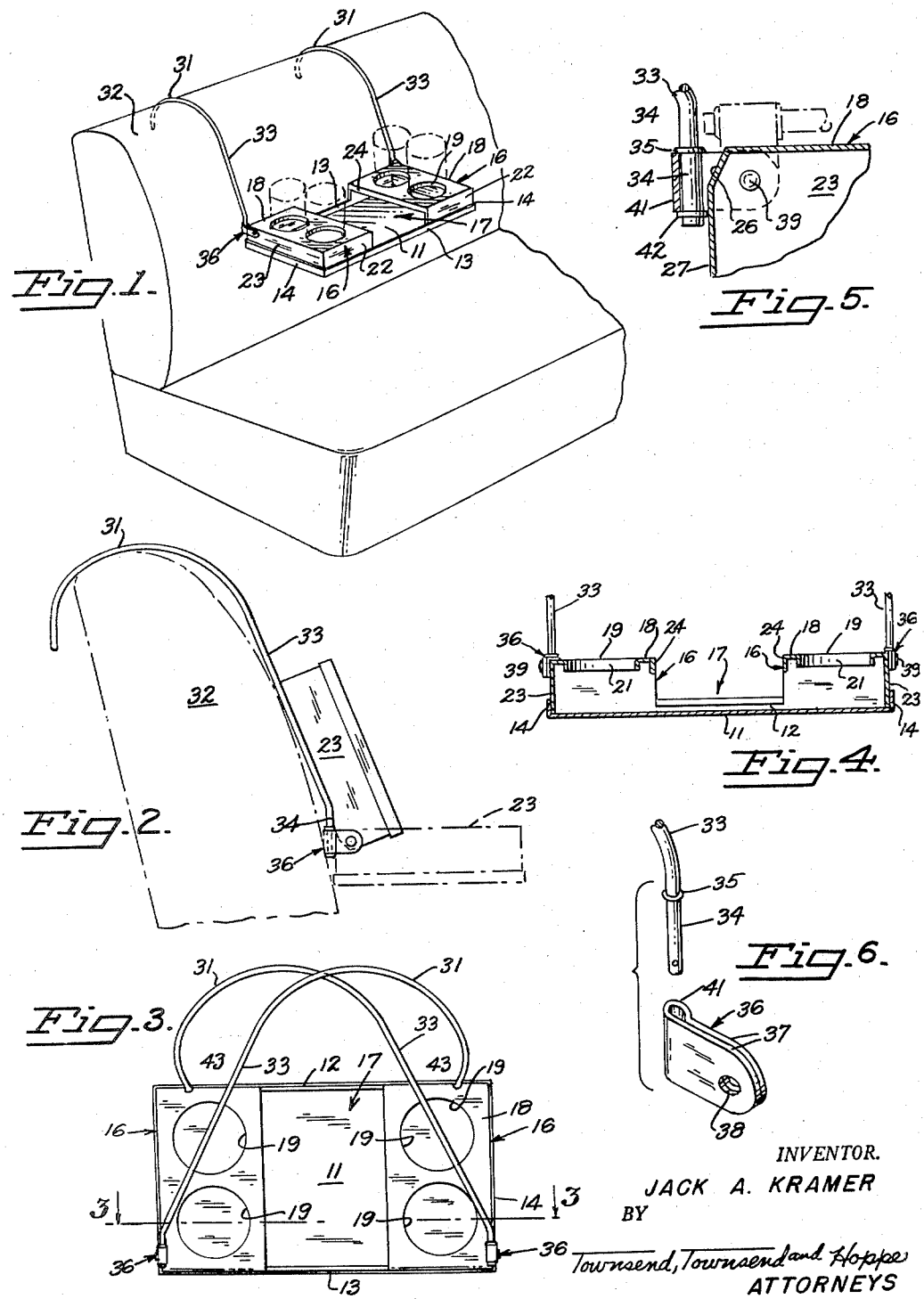
INVENTOR.
JACK A. KRAMER
BY
Townsend, Townsend and Hoppe
ATTORNEYS

United States Patent Office 2,889,051
Patented June 2, 1959

2,889,051

FOLDING SERVING TRAY FOR AUTOMOBILES AND THE LIKE

Jack A. Kramer, Redwood City, Calif.

Application January 23, 1956, Serial No. 560,757

2 Claims. (Cl. 211—74)

This invention relates to a new and improved foldable tray for comestibles.

This invention relates to a tray suitable for holding glasses, cans and other containers for liquids and provided with a compartment for solid foods, such as sandwiches, potato chips and the like. One of the features and advantages of the present invention is the provision of hooks attached to the tray and which may be hooked over the back of an automobile seat, chair or similar support so that the tray may be suspended therefrom in horizontal position.

Another feature and advantage of the tray is the fact that when so suspended from the seat of an automobile, the tray may be folded upwardly so that it does not interfere with use of the automobile and yet is conveniently accessible when desired.

Another feature of the invention is the fact that the hooks which suspend the tray from the seat or other support are attached in such manner that they may be folded into a collapsed position for convenient transportation and storage of the tray.

One of the principal features of the invention is the provision of a flat-bottomed tray having a pair of panels spaced upwardly from the bottom thereof which are apertured to receive and support glasses, cans or other containers. Intermediate the raised panels is a depressed area in which sandwiches, potato chips and other solid comestibles may be placed. Accordingly the tray is a convenient aid for picnics, snacks or similar meals, particularly when partaken of in automobiles.

Other objects of the present invention will become apparent upon reading the following specification and referring to the accompanying drawings in which similar characters of reference represent corresponding parts in each of the several views.

In the drawings:

Fig. 1 is a perspective view showing the tray installed on the front of the front seat of an automobile;

Fig. 2 is a side elevation view showing in full lines the tray in upwardly folded position and in dot-and-dash lines the tray in position of use;

Fig. 3 is a top plan view showing the tray in collapsed position for transportation or storage;

Fig. 4 is a vertical sectional view taken substantially along the line 4—4 of Fig. 3;

Fig. 5 is a fragmentary enlarged sectional view of the hinge and corner construction of the tray; and Fig. 6 is an exploded perspective view of the hinge structure for the hook members.

The tray which is the subject of this invention is preferably made of a relatively rigid material, such as sheet metal, plastic or the like. In the form shown in the accompanying drawings, a bottom panel 11 which is rectangular in shape is formed with peripheral vertically upwardly turned front, rear and side edges 12, 13 and 14, respectively. The height of the edges 12–14, inclusive, is restricted and is sufficient to prevent objects rolling off the tray and to position and support the top panel members 16.

There are preferably provided two top panel members 16, one on each side of the tray, with a space 17 therebetween. Space 17 is intended for sandwiches and other solid comestibles. Each top panel member is formed of a top 18 rectangular in shape and of smaller size than bottom 11. Preferably each top 18 is formed with a pair of circular apertures 19 of a diameter sufficient to receive a glass, beer can or the like. The peripheral edges 21 of apertures 19 are downwardly turned to assist in supporting the container received therein and to reduce the danger to the user from sharp edges. The forward end of each top panel member 16 is formed with a downwardly turned edge 22 which fits within and is secured to upwardly turned front edge 13 of bottom 11. Similar the outer side edge 23 of each top panel member 16 is downwardly turned and fits inside and is secured to the inside of upwardly turned side edge 14 of bottom 11. The inner side edge 24 of each top panel member is shorter than the opposite side 23, so that access to the tray beneath top 18 is facilitated. The rear edge of top panel member 16 is formed at its upper corner with a beveled or angularly disposed portion 26 which provides clearance to permit folding of the hinge, as hereinafter appears. Below beveled portion 26 the rear edge is formed with a downwardly turned portion 27 which fits inside and is secured to rear upwardly turned edge 13 of bottom 11. The foregoing construction, therefore, provides on either side of the tray a panel 18 raised above bottom 11, which panel 18 is apertured.

A pair of hook members is provided for each side of the tray to support the same. Each hook member has an upper curved portion 31 which fits over the back of a seat 32 or similar supporting surface. Immediately below curved portion 31 is a shank portion 33 which fits along the front of seat 32. At the lower end of shank 33 is an annularly disposed swivel portion 34 having a locating bead 35 spaced upwardly from the lower end thereof. It will be understood that the hook portions of the device are formed of a flexible material, such as wire, so that the various sections thereof may be bent to accommodate seats 32 of varying shape or other supporting surfaces. Swivel portion 34 is connected to outer side 23 by means of hinges 36 which are fastened to sides 23 by means of rivets 39 or other suitable fastening means. Each hinge 36 is formed of a sheet metal member bent with a pair of parallel leaves 37 formed at their forward ends with apertures 38 for the reception of rivets 39. The connecting portion between leaves 37 is formed in a circular loop 41 dimensioned to receive swivel portion 34 of the hook members. Bead 35 seats against the upper edge of loop 41. A cotter pin 42 or other suitable fastening device is employed to secure the lower end of swivel portion 34 inside loop 41.

In position of use, offset loop 41 of hinge member 36 fits against the upper edge of vertical portion 27 of the rear edge of top panel member 16, thereby locating swivel portion 34 substantially parallel to rear edge 27 and substantially perpendicular to bottom 11 and top panel 18. In folded position, by reason of beveled corner 26, the swivel portion may be bent substantially parallel to top 18 and bottom 11. The foregoing is best shown in Fig. 5.

In addition to bending at hinge 36, the hooked portions swivel within loop 41 so that, as best shown in Fig. 3, the hook portions fold on top of the tray. The lengths of shank 33 and of curved portions 31 are such that the extremities 43 of curved portions 31 are retained in position by the tray preventing the hooks from swinging around during transportation and storage and facilitating such transportation and storage.

In use curved portions 31 are hooked over a support, such as seat 32. Hinges 36 permit the tray to be moved from its position of use, as illustrated in Fig. 1 and in the dot-and-dash lines of Fig. 2, to an upwardly folded position, as shown in solid lines in Fig. 2. In the upwardly folded position the use of seat 32 is not unduly impeded and yet the device is ready for instant use by merely folding downwardly. Between usage the tray is folded to the collapsed position shown in Fig. 3.

Although the foregoing invention has been described in some detail by way of illustration and example for purposes of clarity of understanding, it is understood that certain changes and modifications may be practiced within the spirit of the invention and scope of the appended claims.

What is claimed is:

1. A folding serving tray for use in automobiles and the like comprising a bottom substantially rectangular in shape, sides extending upward from the bottom along either side edge of the tray, a back extending upward from the bottom along the back of the tray, a pair of elevated panels mounted on side walls above the level of the bottom on either side of the tray, the inner edges of said raised panels being separated to provide a space for solid comestibles therebetween, said panels being apertured for the reception of containers for beverages, a pair of elongated hook members having shanks, a pair of hinges, said hinges being pivotally connected to said sides adjacent the upper rear corners of said sides for movement parallel to said sides externally of said panels, each said hinge comprising a leaf parallel to said side and means forming an offset loop at the end of said leaf opposite the point of connection of said hinge to said side, the lower end of one said shank being rotatably received in said loop, and means to retain said shank in said loop, said shank in erected position extending along and bearing against said back to hold said tray substantially at right angles to said shank.

2. A tray in accordance with claim 1 wherein the upper rear corner of said panel is beveled off and wherein said hinges extend behind and above the beveled off side panels whereby upon folding of said bottom member upwardly relative to said shanks said beveled off portion provides clearance for said hinges.

References Cited in the file of this patent

UNITED STATES PATENTS

| | | |
|---|---|---|
| 1,569,157 | Thompson | Jan. 12, 1926 |
| 2,016,551 | Landis | Oct. 8, 1935 |
| 2,289,945 | Wadsack | July 14, 1942 |
| 2,296,028 | Gribble | Sept. 15, 1942 |
| 2,473,086 | Montero | June 14, 1949 |
| 2,680,523 | Heeter | June 8, 1954 |
| 2,689,156 | Kolander | Sept. 14, 1954 |
| 2,695,712 | Kolander | Nov. 30, 1954 |
| 2,741,521 | Bell et al. | Apr. 10, 1956 |
| 2,778,052 | Lucas | Jan. 22, 1957 |